(12) United States Patent
Tarr

(10) Patent No.: US 6,325,087 B1
(45) Date of Patent: Dec. 4, 2001

(54) DISTRIBUTION VALVE AND METHOD

(75) Inventor: William C. Tarr, Waddell, AZ (US)

(73) Assignee: Shasta Industries, Inc., Phoenix, AZ (US)

( * ) Notice: Subject to any disclaimer, the term of this patent is extended or adjusted under 35 U.S.C. 154(b) by 0 days.

(21) Appl. No.: 09/784,611

(22) Filed: Feb. 15, 2001

Related U.S. Application Data
(60) Provisional application No. 60/246,406, filed on Nov. 7, 2000.

(51) Int. Cl.[7] .............................. G05B 19/06; F16K 31/48
(52) U.S. Cl. .................... 137/1; 137/624.14; 137/119.07; 137/627
(58) Field of Search ............................... 137/119.07, 627, 137/624.2, 624.14, 1

(56) References Cited

U.S. PATENT DOCUMENTS

| | | | |
|---|---|---|---|
| 4,313,455 | * | 2/1982 | Pitman ......................... 137/624.14 X |
| 4,523,606 | | 6/1985 | Gould et al. . |
| 4,570,663 | | 2/1986 | Gould et al. . |
| 4,817,656 | | 4/1989 | Gould . |
| 6,189,556 | * | 2/2001 | Blake et al. ................. 137/624.14 X |

* cited by examiner

Primary Examiner—Kevin Lee
(74) Attorney, Agent, or Firm—Cahill, Sutton & Thomas P.L.C.

(57) ABSTRACT

A distribution valve includes a fluid inlet port and a plurality of fluid outlet ports, wherein the distribution valve includes a housing including a fluid inlet (3). The housing includes an upper section (15B) and a lower section (15B). A gear reduction assembly (2) located in the housing includes a gear reduction mechanism (2A) and impeller (2B) located near the inlet port and connected to a rotary input shaft of the gear reduction mechanism (2A). A cam device (6) engages a rotary output shaft of the gear reduction mechanism so as to rotate the cam device in response to rotation of the impeller. The cam device (6) includes a raised section (6A) having their own a raised camming surface (6B) which rotates in response to rotation of an impeller of the impeller (2B). A plurality of valve assemblies disposed in the lower section (15A) are arranged to open or close fluid paths through the plurality of fluid outlet ports (4), respectively, in response to rotation of the camming surface (6B). Each valve assembly includes a valve seat in the corresponding fluid outlet port, and a hinged valve plate (9) in the lower section (15A) connected to contact the valve seat so as to close the outlet port and to move away from the valve plate to open the outlet port. Each valve assembly also includes a lift pin (10) connected to the valve plate (9) for engaging the camming surface (6B) to open and close the outlet port as the cam device (6) rotates. The cam device (6) rotates in response to the impeller assembly and gear reduction assembly to sequentially open and then close the valve assemblies. In the described embodiment, the cam device (6) operates to begin opening the next sequential valve assembly before completely closing the present valve assembly.

14 Claims, 6 Drawing Sheets

DISTRIBUTION VALVE AND METHOD

CROSS-REFERENCE TO RELATED APPLICATION

This application claims the benefit of prior filed co-pending U. S. provisional application Ser. No. 60/246,406 filed Nov. 7, 2000 entitled "DISTRIBUTION VALVE AND METHOD" by contributor William C. Tarr.

BACKGROUND OF THE INVENTION

The invention relates to distribution valves, particularly to distribution valves for distributing water from the high-pressure side of a swimming pool pump to various groups of cleaning heads located along the inner surface of a swimming pool, particularly to such distribution valves which require less torque to be produced by an internal impeller and gear reduction assembly, and more particularly to such distribution valves which can deliver a large amount of water for each outlet port with a low water pressure drop across an open the outlet port with a valve.

A number of multi-port distribution valves for sequentially distributing pressure from the high pressure port of a swimming pool pump to various groups of cleaning heads imbedded in the bottom and side walls of the pool are known. These include the distribution valve disclosed in commonly assigned U.S. Pat. No. 4,523,606 by Gould et al., issued Jun. 18, 1985, entitled "DISTRIBUTION VALVE" and U.S. Pat. No. 4,570,663 by Gould et al., issued Feb. 18, 1986, entitled "DISTRIBUTION VALVE WITH DUAL CAMS TO PREVENT UNCONTROLLED EXCURSIONS OF VALVE BALLS", both of which are incorporated herein by reference. Each of the distribution valves disclosed in the above referenced patents includes an impeller-driven gear reduction mechanism and a plurality of outlet valves controlled in response to the gear reduction mechanism. U.S. Pat. No. 4,523,606 and 4,570,663 disclose gear reduction mechanisms which include a stationary planetary gear disposed about a vertical axis of the distribution valve, a pair of symmetric gear assemblies each driven by a gear attached to the impeller, with each of the symmetric gear assemblies being supported on a rotary gear support base, and each also having an outer gear engaging the teeth of the planetary gear to cause the rotary gear assembly base to rotate in response to rotation of the impeller and thereby drive at least one foot-shaped cam which rotates through a 360° angle and sequentially displaces balls from a valve seat of an outlet port. In each of the above prior distribution valves the pool return water from the high pressure side of the pool pump is fed into a vertical inlet pipe connected to the top of a dome-shaped cover section of the distribution valve.

The above mentioned distribution valves have been widely used, and the gear and impeller mechanisms have proven highly reliable.

However, a fairly large force is required to be applied by the gear reduction mechanism to turn the cam that pushes the valve balls away from their valve seats in order to open the valves. Common mineral deposits may occur on the valve balls and gears and may further increase the amount of torque required to be applied by the cam a to push the valve balls from their valve seats. The increased amount of required torque greatly increases the amount of stress on the gears of the planetary gear assembly. The results of the stress include "locking up" of the gear reduction mechanism and breaking of the gears in the planetary gear assembly, resulting in the need for repair and maintenance and associated downtime for the pool recirculation and cleaning system. That causes increased warranty replacement costs and loss of customer good will.

The above described distribution valves typically require approximately 18–22 in. lbs. of torque to be applied by the planetary gear assembly to rotate cam as necessary to displace the various valve balls in order to open the valves. It would it would be desirable to provide a distribution valve which requires substantially less torque to be produced by the gear reduction mechanism of the distribution valve in order to ten the cam, which then pushes the valve balls away from their respective valve seats in order to open the valves, because this would reduce stress and wear on the gears of the planetary gear assembly, and would result in longer product life before repairs are needed.

It would be desirable to increase the amount of water that can be pumped through each port of the above mentioned distribution valves without increasing the water pressure drop across the open valve. It would be especially desirable to accomplish this benefit without an expensive re-tooling of the molds needed to manufacture the upper and lower housings of the above described distribution valves. It also would be very desirable to accomplish the same benefit without having to redesign the planetary gear assembly presently being used. It also would be very desirable to be able to retrofit existing distribution valves with an improved valve structure which does not have the above mentioned problems associated with mineral deposits and which can be accomplished at a very low cost, perhaps even by do-it-yourselfers.

SUMMARY OF THE INVENTION

It is an object of the invention to provide an improved distribution valve which requires substantially less torque to turn a cam which successively opens the sequence of outlet ports of the distribution valve.

It is another object of the invention to provide an improved distribution valve which reduces the pressure drop across each internal valve when it is open, especially in the presence of mineral deposits from swimming pool water on internal parts of the distribution valve.

It is another object of the invention to provide an improved distribution valve which results in longer life of an internal gear reduction assembly.

Briefly described, and in accordance with one embodiment thereof, the invention provides a distribution valve having a fluid inlet port and a plurality of fluid outlet ports, wherein the distribution valve includes a housing including a fluid inlet (3). The housing includes an upper section (15B) and a lower section (15B). A gear reduction assembly (2) located in the housing includes a gear reduction mechanism (2A) and impeller (2B) located near the inlet port and connected to a rotary input shaft of the gear reduction mechanism (2A). A cam device (6) engages a rotary output shaft of the gear reduction mechanism so as to rotate the cam device in response to rotation of the impeller. The cam device (6) includes a raised section (6A) having a raised camming surface (6B) which rotates in response to rotation of an impeller of the impeller (2B). A plurality of valve assemblies disposed in the lower section (15A) are arranged to open or close fluid paths through the plurality of fluid outlet ports (4), respectively, in response to rotation of the camming surface (6B). Each valve assembly includes a valve seat in the corresponding fluid outlet port, and a hinged valve plate (9) in the lower section (15A) connected to contact the valve seat so as to close the outlet port and to move away from the valve plate to open the outlet port. Each valve assembly also includes a lift pin (10) connected to the valve plate (9) for engaging the camming surface (6B) to open and close the outlet port as the cam device (6) rotates. The plurality of outlet ports (4) are concentrically disposed around the cam device (6). The cam device (6) rotates in response to the impeller assembly and gear reduction assembly to sequentially open and then close the valve assemblies. In the described embodiment, the cam device (6) operates to begin opening the next sequential valve assembly before completely closing the present valve assembly.

DETAILED DESCRIPTION OF THE PREFERRED EMBODIMENTS

Figure 1A:
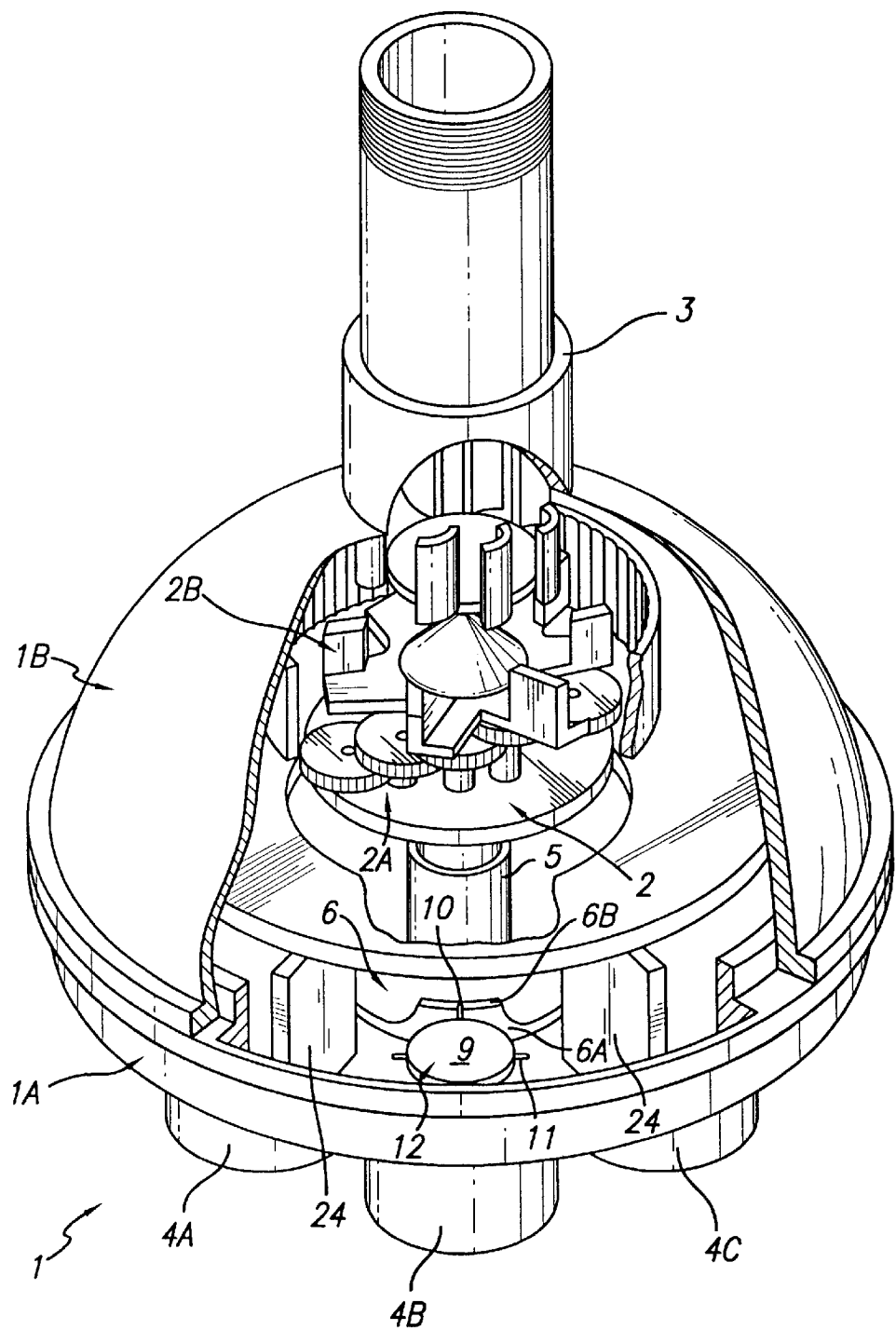
FIG. 1A is a partial cutaway perspective view of one embodiment of a distribution valve according to the invention.
Figure 2:
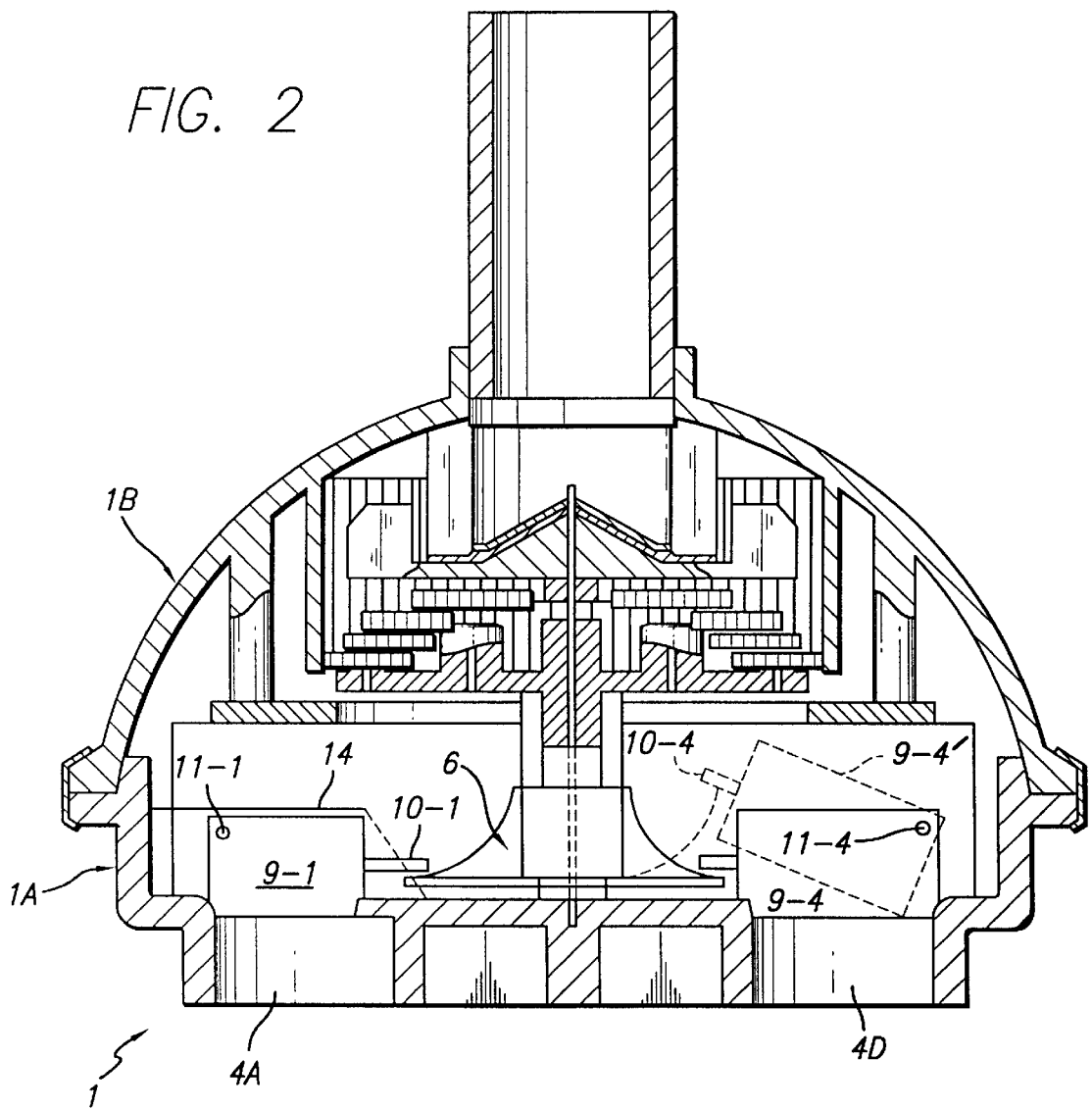
FIG. 2 is a partial section view of the embodiment of FIG. 1A.

Referring to FIGS. 1A and 2, one embodiment of the invention includes a distribution valve 1 having a lower section 1A and a separable upper section 1B that is clamped in sealed relationship to lower section 1A. Upper section 1B includes an inlet port 3 as shown. Lower section 1A includes a plurality (in this case, six) of concentrically arranged outlet ports 4, specifically outlet ports 4A, B, C, etc., which sometimes are it collectively or individually referred to only by reference numeral 4. A gear reduction assembly 2 within distribution valve 1 includes a gear reduction mechanism 2A having an input shaft driven by an impeller 2B. The gear reduction assembly 2 can be essentially as described in any of the above mentioned references, which are incorporated herein by reference. The gear reduction mechanism 2A includes a downward-extending output shaft 5 which is connected to a cam device 6. Cam device 6 includes a raised peripheral section 6A having thereon a camming surface 6B. As cam device 6 rotates, camming surface 6B operates to sequentially open and close a plurality of valve assemblies 12, one of which is disposed in the fluid path through each of outlet ports 4A, B, C, etc., respectively.

Each of valve assemblies 12 includes a valve plate 9 having a flat bottom surface that precisely rests on and seals against a valve seat surrounding the fluid passage through the associated outlet port 4. Each valve plate 9 is pivotally connected by a pivot pin 11 to a boss 21 (not shown in FIG. 1A) so that valve plate 9 can be raised by camming surface 6B to open the valve and thereby allow swimming pool water forced into inlet port 3 to be forced out of the way subject outlet port 4.

The hinged structure allows the valve plate 9 to be raised by the camming surface 6B as the cam device 6 rotates, so as to open the valve assembly 12 of outlet port 4 and allow the swimming pool water forced into inlet port 3 to pass through distribution valve 1A. and be forced out of the subject open outlet port 4. The hinged structure also allows the valve plate 9 to be lowered by cam device 6 onto the valve seat to close the valve and thereby prevent the swimming pool water from flowing out of the subject outlet port. Dotted line 9-4' in FIG. 2 shows the raised configuration of valve plate 9-4 (FIG. 3) while its lift pin 10-4 (FIG. 3) is supported on subsequently described camming surface section 6B-2 (FIG. 4). At the same time, all of the remaining valve plates 9 rest on and completely seal against the valve seats of their corresponding outlet ports 4. Numeral 14 in FIG. 2 designates a boss or structure in which the hinge pins 11 are journaled.

Figure 1B:
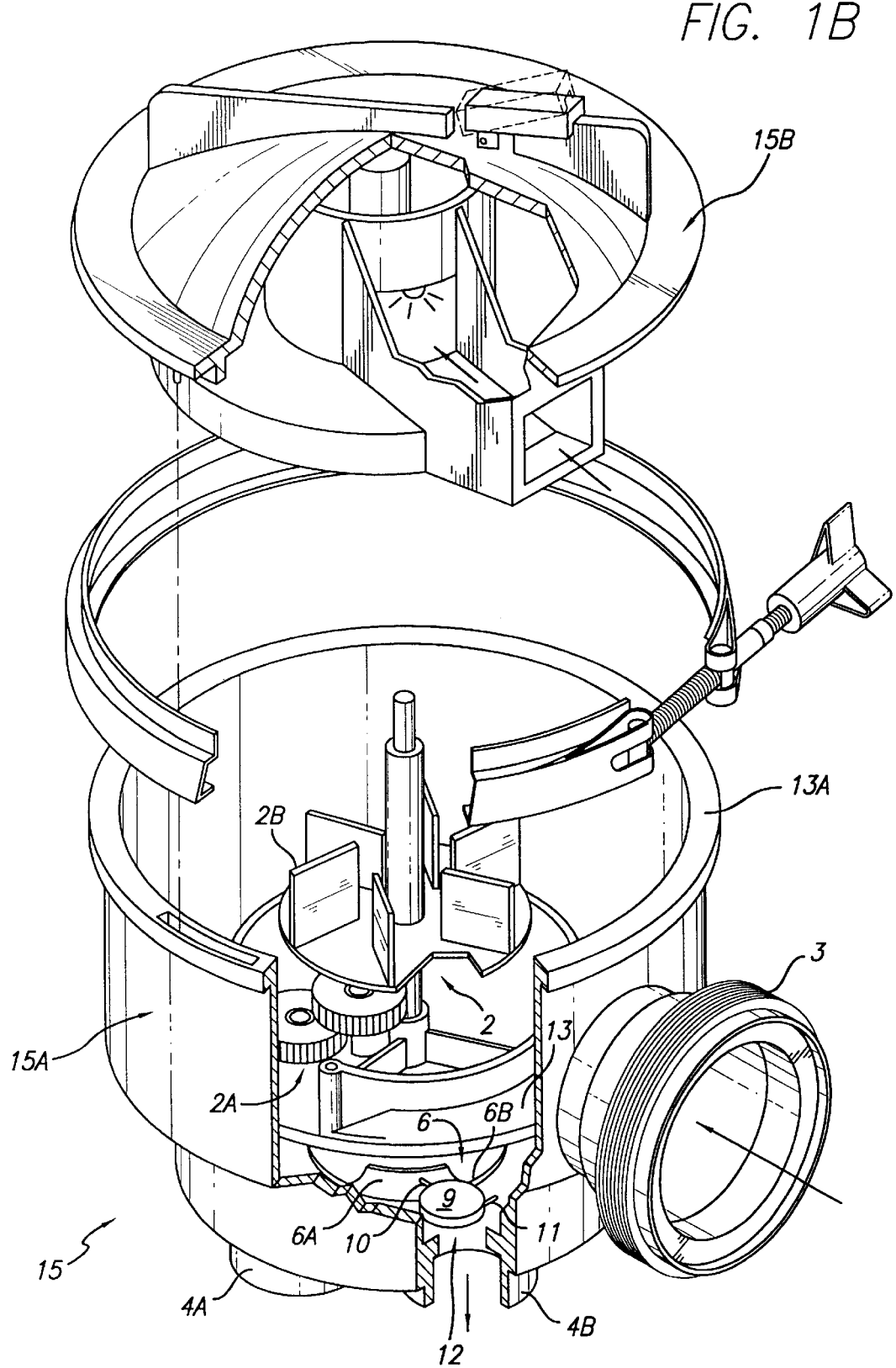
FIG. 1B is a partial exploded, cutaway perspective view of a second embodiment of a distribution valve according to the invention.
Figure 3:
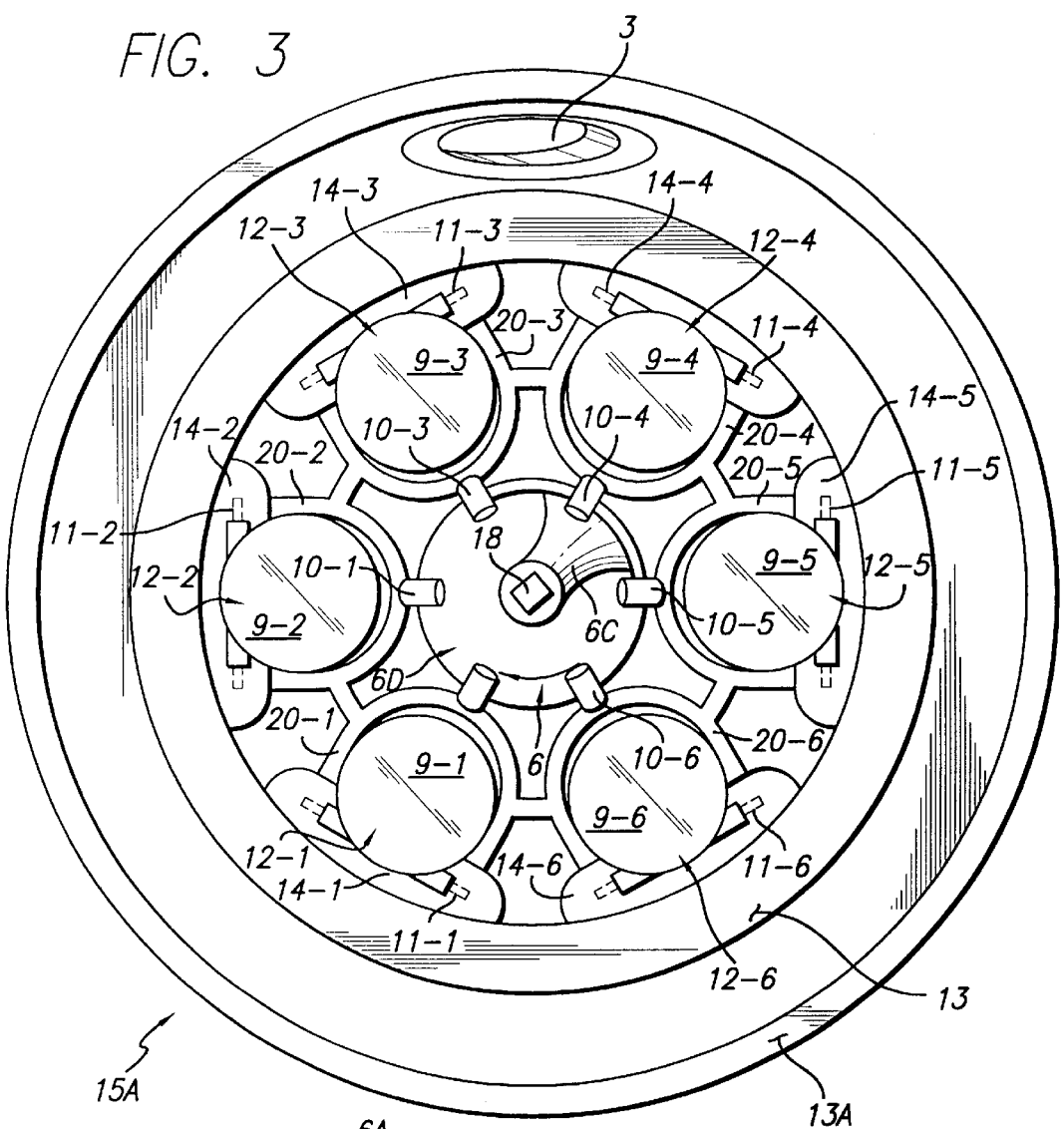
FIG. 3 is a partial top perspective view of the lower section 15A of FIG. 1B
Figure 4:
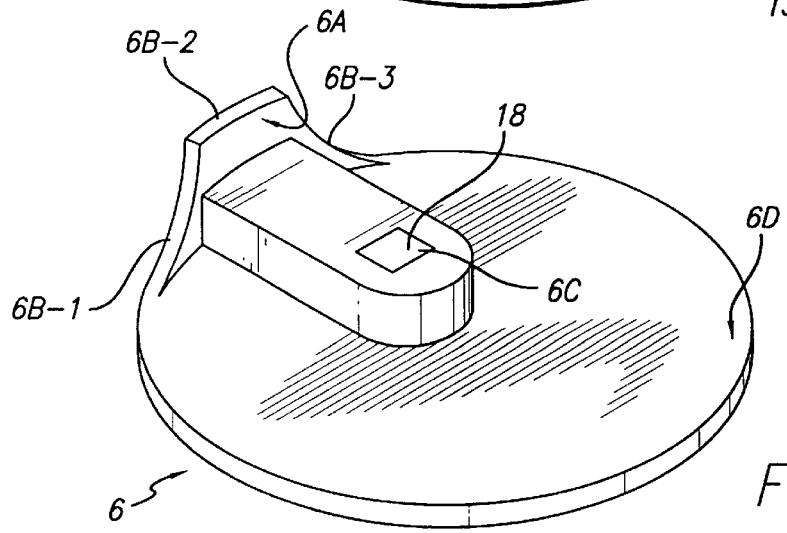
FIG. 4 is a perspective view of the cam 6 in FIG. 3.

FIG. 3 shows a top view of lower section 15A with upper section 15B of distribution valve 15 of FIG. 1B removed. The valve assemblies 12-1,2, . . . 6 are shown surrounding cam device 6. As illustrated, lift pin 10-4 rests on camming surface 6B and valve plate 9-4 is pivoted upward about pivot pin 11-4, so valve assembly 12-4 is fully open. All of the other valve assemblies are completely closed.

Referring to FIG. 1B, another distribution valve 15 includes a lower section 15A and an upper section 15B. The general structures of sections 15A and 15B, except for the valve assemblies of the present invention, are described in commonly assigned co-pending application "LOW PROFILE, LOW RESISTANCE DISTRIBUTION VALVE AND METHOD FOR SWIMMING POOLS", by Blake et al., Ser. No. 09/189,176 filed on Nov. 10, 1998, Docket No. 2108-A-14, incorporated herein by reference. Distribution valve 15 of FIG. 1B differs from distribution valve 1 of FIG. 1A mainly in that inlet port 3 in FIG. 1A is provided in upper section 1B, whereas in FIG. 1B, the inlet port 3 is provided in lower section 15A. The valve assemblies 12 and the cam device 6 in FIG. 1B are essentially the same as described above with reference to FIGS. 1A and 2.

The details of cam device 6, which can be composed of ABS plastic material, are shown in FIG. 4. Cam device 6 includes base 6D having an integral circumferential raised element 6A and an integral raised section 6C on the upper surface of the base 6D. A camming surface 6B, including camming surface sections 6B-1, 6B-2 and 6B-3, is provided on raised section 6A. The lift pins 10 of the various valve plates 9 ride up on camming surface 6B to open and close various the valve assemblies 12 as cam device 6 rotates. A square hole 18 in inner raised section 6C receives a the corresponding square drive from the lower portion of drive shaft 5, which is connected to the output shaft of gear reduction mechanism 2A.

Camming surface 69 includes a central horizontal section 6B-2 and the two symmetrically opposed inclined camming surfaces 6B-1 and 6B-3. If cam device 6 rotates clockwise as viewed in FIG. 4, each lift pin 10 rides up inclined camming surface section 6B-3 so as to gradually open the corresponding valve plate 9, then hold that valve plate open as lift pin 10 rides along horizontal camming surface section 6B-2, and gradually lowers the valve plate 9 to gradually close the valve as the lift pin 10 rides down inclined camming surface section 6B-1.

Preferably, the lower portions of camming surface sections 6B-3 and 6B-1 are located such that as the closing of one valve is being completed, the opening of the next valve is beginning to occur, so there is never a time when all of the valves are completely closed. This prevents a "spike" in the water pressure inside the distribution valve.

Figure 5:
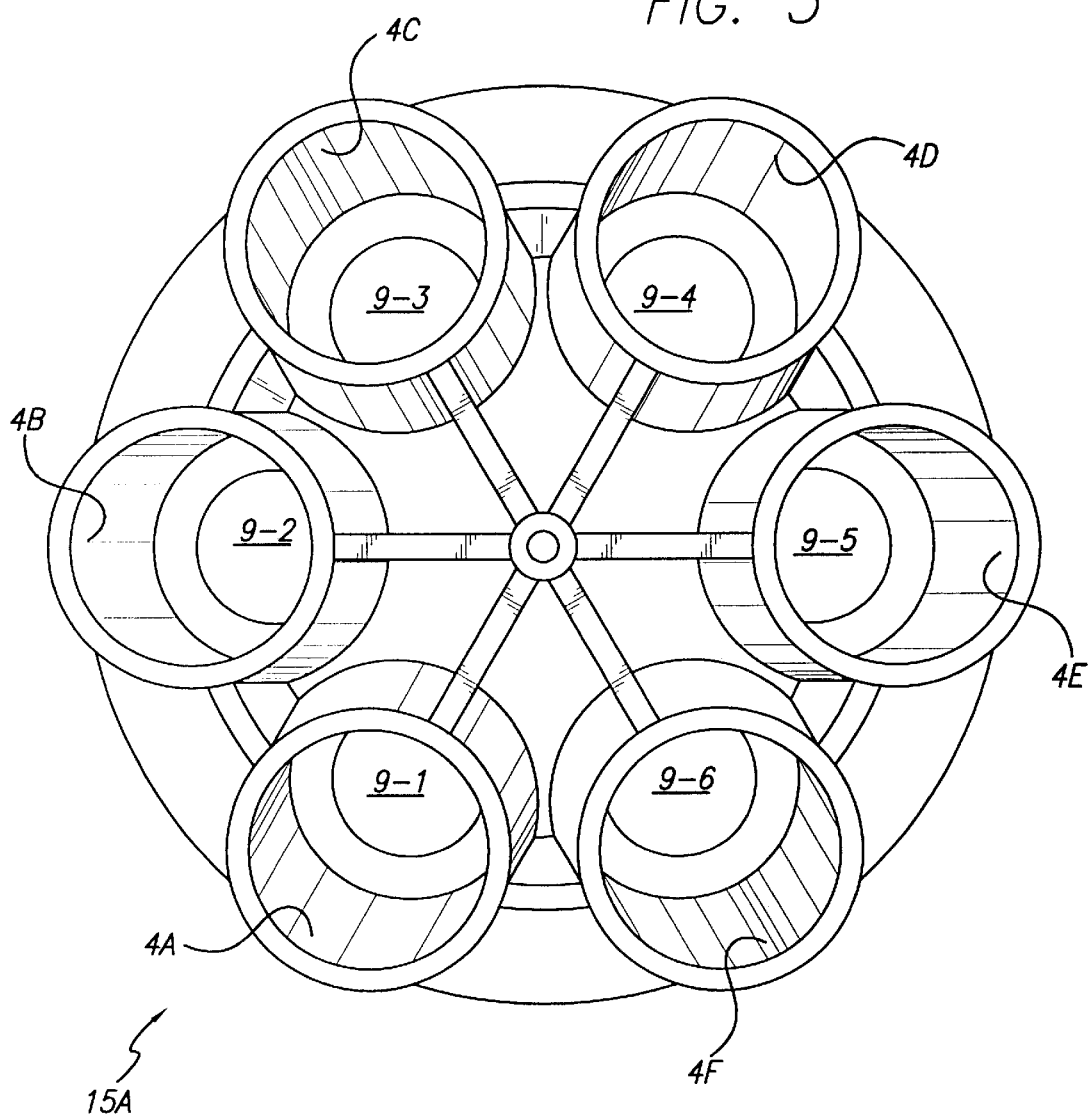
FIG. 5 is a bottom perspective view of the lower section 15A of FIG. 1B.

FIG. 5 shows a perspective view of the bottom of lower section 15A of distribution valve 15 of FIG. 1B. As illustrated in FIG. 5, valve plates 9-4 and 9-5 both are slightly open, indicating that one of them is at the last stage of being closed and the other is at the beginning stage of being opened. The remaining valve plates 9 in FIG. 5 are completely closed and seals against their respective valve seats.

Figure 7:
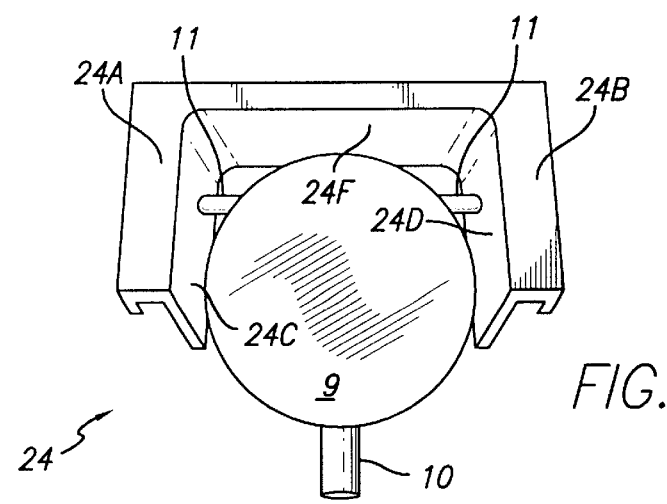
FIG. 7 is a top perspective view of a single valve assembly 24 shown in FIG. 6.
Figure 6:
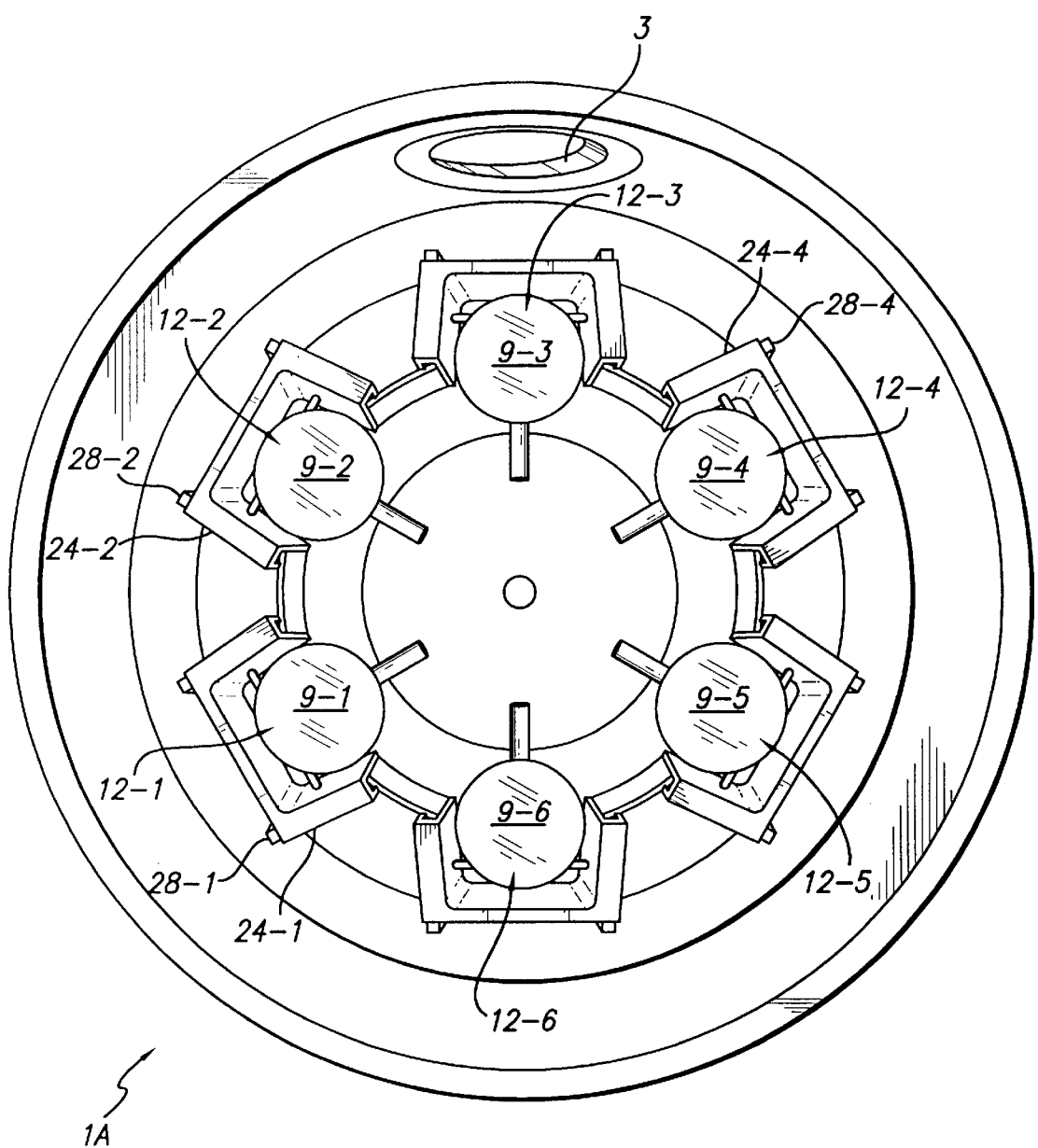
FIG. 6 is a partial top perspective view of the lower section 1A of FIG. 1A.

FIG. 6 shows a perspective top view of lower section 1A of distribution valve 1 of FIG. 1A, wherein six retrofittable valve assemblies 24-1,2 . . . 6 are snapped on to the elevated ridges 28-1,2 . . . 6 as shown. FIG. 7 shows the details of a single valve assembly 24, wherein valve plate 9, with lift pin 10 extending therefrom, is connected by hinge pin 10 to a clip-on frame including a U-shaped wall having opposed side walls 24C and 24D connected in perpendicular relationship to a back plate 24F as shown. Clip-on flanges 24A and 24B arc attached to and integral with the upper edges of side walls 24C and 24D, as shown. If necessary, the undersides of flanges 24A and 24B can be attached by a drop of glue to the elevated ridges 28-1 etc.

The above described distribution valves avoid the need to use the precisions spherical acrylic valve balls of the prior art, and provide the additional advantages of requiring very little torque (only approximately 5 inch-pounds at a flow rate of approximately 50 gallons per minute, or even more, through the distribution valve) to be applied to rotate cam device 6 so as to properly open the valve mechanisms 212. The little torque results in very little stress and wear of the gear reduction mechanism 2A, which reduces maintenance costs.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention.

What is claimed is:

1. A distribution valve having a fluid inlet port and a plurality of fluid outlet ports, the distribution valve comprising:
    (a) a housing including
        i. a lower section,
        ii. a removable upper section for sealed connection to the lower section;
    (b) a gear reduction assembly inside the housing, the gear reduction assembly including a gear reduction mechanism and impeller assembly located in fluid communication with the inlet and connected to a rotary input shaft to drive the gear reduction mechanism;
    (c) a cam device engaging a rotary output shaft of the gear reduction mechanism, the cam device having a raised camming surface, the cam device and camming surface thereon rotating in response to rotation of an impeller of the impeller assembly; and
    (d) a plurality of valve assemblies in the lower section arranged to open and close fluid paths through the plurality of fluid outlet ports, respectively, in response to the rotation of the camming surface, each valve assembly including
        i. a valve seat in the corresponding fluid outlet port,
        ii. a hinged valve plate in the lower section connected to contact the valve seat so as to close the outlet port and so as to move away from the valve plate to open the outlet port, and
        iii. a lift pin connected to the valve plate for engaging the camming surface to lift and lower than the valve plate as the cam device rotates to thereby open and close the valve assembly.

2. The distribution valve of claim 1 wherein the plurality of valve assemblies are concentrically disposed around the cam device.

3. The distribution valve of claim 2 wherein the cam device rotates in response to the impeller assembly and gear reduction assembly so as to sequentially open and then close the valve assemblies.

4. The distribution valve of claim 3 wherein the cam device operates to begin opening the next sequential valve assembly before completely closing a presently open valve assembly.

5. The distribution valve of claim 1 wherein the inlet port is in the upper section and the outlet ports are in the lower section.

6. The distribution valve of claim 1 wherein the inlet port is in the lower section and the outlet ports are in the lower section.

7. The distribution valve of claim 1 wherein the gear reduction assembly is a planetary gear assembly.

8. The distribution of claim 1 wherein each valve plate is connected by a hinge pin journaled in a boss extending upward from and attached in fixed relation to the floor of the lower section.

9. The distribution valve of claim 1 wherein each valve plate is connected by a hinge pin to a retrofittable bracket that fits onto a boss extending upward from a floor of the lower section.

10. The distribution valve of claim 1 wherein the cam device includes a lower base driven by the gear reduction assembly supporting a peripheral camming member extending upward from the base, and a camming surface on the camming member.

11. The distribution valve of claim 10 wherein the camming surface includes a leading rising inclined camming surface, followed by a level camming surface, followed by a trailing falling inclined camming surface.

12. A method of distributing water pumped from a swimming pool to an inlet port of a distribution valve through a plurality of outlet ports of the distribution valve to cleaning heads disposed in interior surfaces of the swimming pool, the method comprising:
    (a) providing a valve assembly in the distribution valve for each outlet port for opening and closing the outlet port, each valve assembly including a valve seat in the outlet port, a hinged valve plate connected so as to swing against the valve seat to close the outlet port and the swing away from the valve scat so as to open the outlet port, and a pin connected to the valve plate for moving the valve plate to open and close the outlet port;
    (b) rotating a cam device in response to a gear reduction mechanism in the distribution valve, the cam device being driven by an impeller in fluid communication with pressurized water in the inlet port; and
    (c) a leading camming surface engaging the pin of a first valve plate with a leading camming surface of the cam device to begin moving the first valve plate to begin opening of a first outlet port while also engaging a pin of a second valve plate with a trailing camming surface to move the second valve plate so as to complete closing of a second outlet port adjacent to the first outlet port, the leading camming surface continuing to move the first valve plate so as to completely open the first outlet port after the second outlet port is completely closed, all of the remaining outlet ports being closed.

13. The method of claim 12 including lifting the first valve plate to open the first outlet port and lowering the second valve plate to close the second outlet port.

14. The method of claim 13 including opening and closing the outlet ports by applying less than approximately five inch-pounds of torque to the cam device by means of the gear reduction mechanism at a flow rate of approximately 50 gallons per minute or more.

* * * * *